United States Patent [19]

Kautz

[11] 4,412,223
[45] Oct. 25, 1983

[54] ANTENNA ARRAY WITH ELEMENT ISOLATION IN THE COUPLING NETWORK

[75] Inventor: Werner Kautz, Korntal, Fed. Rep. of Germany

[73] Assignee: International Standard Electric Corporation, New York, N.Y.

[21] Appl. No.: 282,320

[22] Filed: Jul. 10, 1981

[30] Foreign Application Priority Data

Jul. 19, 1980 [DE] Fed. Rep. of Germany ....... 3027451

[51] Int. Cl.³ ........................................... H01Q 21/06
[52] U.S. Cl. .................................... 343/844; 343/876
[58] Field of Search ................. 343/844, 854, 853, 876

[56] References Cited

U.S. PATENT DOCUMENTS 3,213,458 10/1965 Hansel et al. ...................... 343/854
3,396,398 8/1968 Dunlavy .............................. 343/844
4,191,960 3/1980 Lopez ................................. 343/854

Primary Examiner—Eli Lieberman
Attorney, Agent, or Firm—John T. O'Halloran; Alfred C. Hill

[57] ABSTRACT

To isolate adjacent elements of an antenna array from each other, each feeder contains a power divider with four terminals, two of which are connected to the power dividers associated with the adjacent elements. The power dividers feed r.f. energy to the inactive elements in such a way that the latter no longer act as parasitic elements. The r.f. power dividers are so designed that three is a mismatch when looking from the antenna toward the power divider. This gives a further improvement in the isolation between adjacent antennas.

6 Claims, 2 Drawing Figures

ANTENNA ARRAY WITH ELEMENT ISOLATION IN THE COUPLING NETWORK

BACKGROUND OF THE INVENTION

1. Field of the Invention

The present invention relates to an antenna array and, more particularly, to an array wherein the individual antennas are each connected by a separate RF (radio frequency) line to a switching device for activation.

2. Description of the Prior Art

An antenna array of the above-mentioned type is described in a book entitled "Funksysteme fur Ortung und Navigation", Verlag Berliner Union GmbH, Stuttgart, 1973, on pages 139 to 145.

The antenna array is described there in connection with a Doppler VHF omnirange (Doppler VOR). It contains several omnidirectional antennas arranged on a circle.

In navigation systems, such as the Doppler VOR, it is of utmost importance that the RF signals be radiated exactly in the manner prescribed.

If, for example, a signal is to be radiated from only one antenna at a time, this is nearly impossible with a small antenna spacing. RF energy from the radiating antenna also reaches the adjacent antennas, which act as parasitic radiators.

SUMMARY OF THE INVENTION

An object of the present invention is to provide an antenna array in which adjacent antennas are optimally isolated from each other.

This object is attained by an antenna array wherein the individual antennas are activated by an antenna switching device, and wherein each antenna is connected to the antenna switching device via a separate RF line. Each of the R.F. lines contains a reciprocal power divider having four terminals. One terminal is connected to the antenna switching device, another to the respective antenna, and the other two terminals are connected via additional RF lines to the power dividers associated with the adjacent antennas. The terminal of the reciprocal power divider that is associated with the antenna has an impedance unequal to the input impedance of the antenna, and the terminals that are associated with the additional RF lines have impedances equal to the input impedances of the antennas.

In the novel antenna array, isolation is provided over a broad bandwidth. The array can be fed simultaneously at several points. The reflection factors of the individual antennas can be measured.

DESCRIPTION OF THE DRAWINGS

Above-mentioned and other features and objects of this invention will become more apparent by reference to the following description taken in conjunction with the accompanying drawing, in which.

DESCRIPTION OF THE INVENTION

Figure 1:
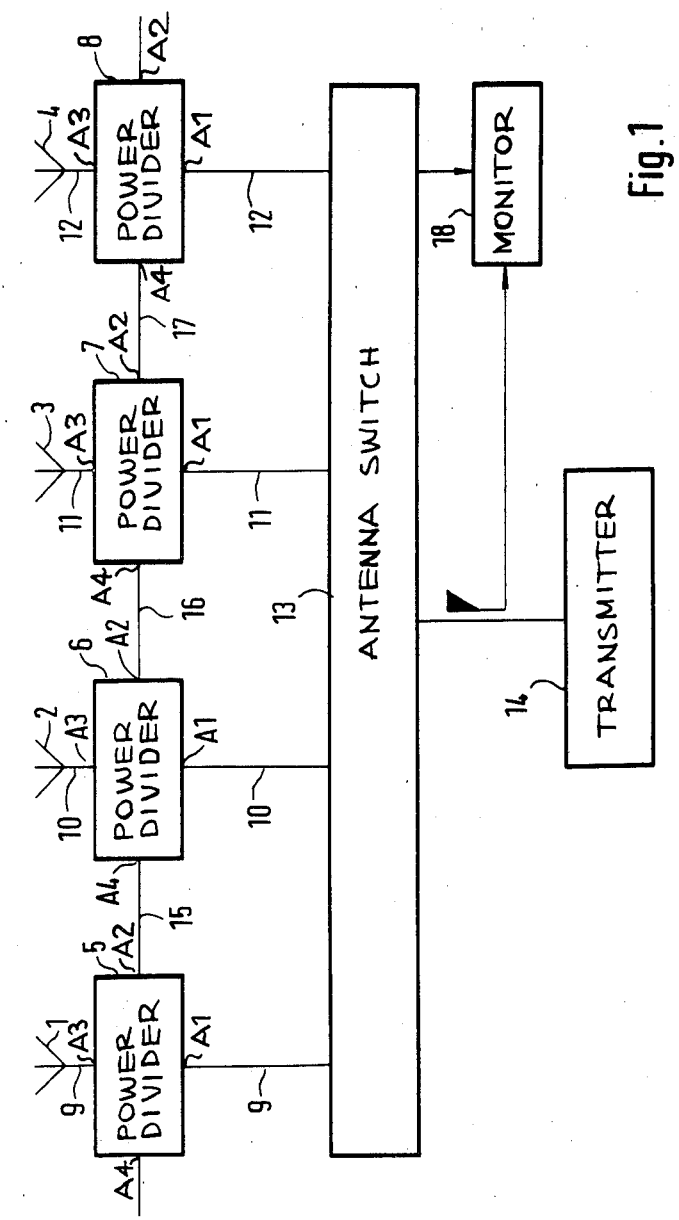
FIG. 1 is a block diagram of the antenna array with isolation networks.

In the antenna array of FIG. 1, several antennas 1, 2, 3, and 4 are connected to an antenna switching device 13 via RF lines 9, 10, 11, and 12, respectively. The antenna switching device is supplied with RF energy from a transmitter 14 and feeds this energy simultaneously or successively to one or more of the antennas.

If the antenna array forms part of a Doppler VOR, the antennas are arranged on a circle and are activated one after the other. The antenna switching device will not be explained here because it is generally known (e.g., from the reference cited above).

In the novel antenna array, reciprocal power dividers 5, 6, 7, and 8, each having four terminals A1, A2, A3 and A4 are inserted in each of the RF lines 9, 10, 11 and 12. One of the terminals, A1, of each divider is connected to the antenna switching device 13, and another terminal, A3, is coupled to the associated antenna, while the two remaining terminals are connected, respectively, to the adjacent power dividers, which are associated with the adjacent antennas. If the antenna array is a linear array, those terminals of the power dividers having no adjacent power divider associated therewith are connected to a suitable termination.

When the antenna 2 is radiating an RF signal, i.e., when it is active, the RF radiation also reaches the adjacent antennas 1 and 3, which reradiate it and thus act as parasitic radiators. This is undesirable.

Therefore, the power dividers, e.g. 6, not only feed the active antenna 2 with the RF energy allotted to it but also split off a part of this RF energy and feed it to the adjacent antennas 1 and 3. The power dividers and the additional RF lines 15 and 16 are so proportioned that the RF energy thus fed to the antennas 1 and 3 compensates for the RF energy received by the antennas 1 and 3 from the antenna 2. The antennas 1 and 3 then no longer act as parasitic radiators but are isolated from each other.

The proportioning of the power dividers and the RF lines depends on, among other things, the power to be radiated, the antenna design, and the antenna spacing. If the person skilled in the art knows the design of the novel antenna array with isolation networks and the operating data, he can easily determine the values to be chosen (influence on amplitude and phase).

Figure 2:
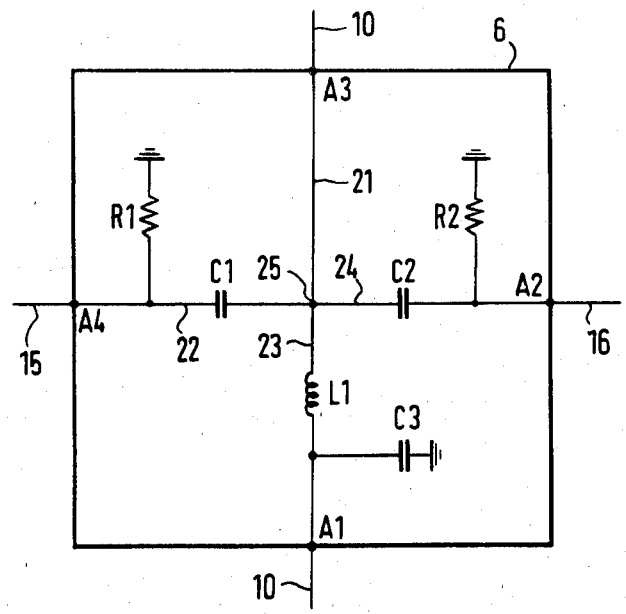
FIG. 2 shows details of an isolation network of FIG. 1.

The power divider 6 of FIG. 1 will now be explained in more detail with the aid of FIG. 2.

Lines 21, 22, 23 and 24 run from the terminals to a common node 25 in the power divider 6. Inserted in the lines 22 and 24, which are connected to the terminals A4 and A2, are capacitors C1 and C2, respectively. The values of these capacitors determine the division ratio of the power divider. Resistor R1 between the line 22 and ground, resistor R2 between the line 24 and ground, and inductor L1 in the line 23, and a capacitor C3 between the line 23 and ground serve to match the impedances of the terminals.

The output impedance of the transmitter 14 is 50Ω (ohms). Capacitors C1 and C2 have a value of 27 pF (picofarad), and resistors R1 and R2 have a value of 50Ω. Inductor L1 and capacitor C3 are chosen so that the common node 25 has an impedance of 50Ω as seen from the transmitter, and an impedance of about 15Ω as seen from the antenna.

It is important that there be a mismatch to the transmitter as seen from the antenna, i.e., that the power-divider terminal A3, which is connected to the antenna 2, not be matched to the antenna. As a result of this mismatch, only little parasitic excitation of the antenna takes place, whereby isolation is further improved.

When undesired energy reaches any of the antennas, the input impedance of this antenna changes, and this reacts on the impedance of the terminal A1 connected to the antenna switching device 13. Power is reflected to the antenna switching device 13 when the termina A1 is no longer matched as a result of the impedance change at the antenna input. If each of the lines 9, 10 11, and 12 is connected to a directional coupler which couples out part of the current flowing back to the antenna switching device 13, the output signal of the directional coupler indicates whether any undesired energy is reaching the antenna associated with the coupler.

Instead of connecting each of these lines to a directional coupler, it suffices to extract the current flowing back to the transmitter only from the antenna switching device 13. The output signal of the directional coupler than indicates whether any of the antennas is disturbed. From the connecting rhythm of the antenna switching device 13, a monitoring device 18 then determines which antennas are disturbed, so that the antenna array can be monitored in a particularly advantageous manner.

The monitoring device 18 is not truly a part of the invention but provides an advantage in that it can extract current flowing back to the transmitter 14, which current would indicate if an antenna is disturbed if it exceeds a certain level by providing an output from a level detector. The switching device 13 could also be provided with a means for providing a coded signal to indicate which antenna is activated. The monitor 18 could then decode the signal to provide a signal on one of several outputs corresponding to the antennas. The outputs of the decoder could be connected to AND gates along with an output from the level detector and the appropriate AND gate output would indicate which antenna is disturbed.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. In an antenna array including a plurality of individual antenna elements each activated by an antenna switching device and a plurality of RF lines each connecting a different one of said plurality of antenna elements to said switching device, an improvement comprising:

a plurality of reciprocal power dividers to isolate adjacent ones of said plurality of antenna elements from each other, each of said plurality of power dividers being associated with a different one of said plurality of antenna elements and disposed in an associated one of said plurality of RF lines, each of said plurality of dividers having four terminals, a first of said four terminals being connected to said antenna switching device, a second of said four terminals being connected to an associated one of said plurality of antenna elements, a third of said four terminals being connected to one of said plurality of power dividers associated with a first adjacent one of said plurality of antenna elements and a fourth of said four terminals being connected to another of said plurality of power dividers associated with a second adjacent one of said plurality of antenna elements.

2. An antenna array wherein the individual antennas are activated by an antenna switching device, and wherein all antennas are connected to the antenna switching device via one RF line each, wherein the improvement comprises:

a reciprocal power divider associated with each antenna and disposed in the associated RF line, said dividers having four terminals connected respectively to the antenna switching device, to the respective antenna and to the power dividers associated with the adjacent antennas, the terminal of the reciprocal power divider that is connected with the antenna has an impedance unequal to the input impedance of the antenna.

3. An antenna array wherein the individual antennas are activated by an antenna switching device, and wherein all antennas are connected to the antenna switching device via one RF line each, wherein the improvement comprises:

a reciprocal power divider associated with each antenna and disposed in the associated RF line, said dividers having four terminals connected respectively to the antenna switching device, to the respective antenna and to the power dividers associated with the adjacent antennas, the terminals of a power divider which are connected to the power dividers associated with the adjacent antennas have impedances equal to the input impedances of the antennas.

4. In an array according to claim 1, wherein said second of said four terminals has an impedance unequal to an input impedance of said associated one of said plurality of antenna elements.

5. In an array according to claim 4, wherein each of said third and fourth of said four terminals have an impedance equal to an input impedance of each of said adjacent one of said plurality of antenna elements.

6. In an array according to claim 1, wherein each of said third and fourth of said four terminals have an impedance equal to an input impedance of each of said adjacent one of said plurality of antenna elements.

* * * * *